Patented May 7, 1940

2,200,164

UNITED STATES PATENT OFFICE 2,200,164

ABRASIVE AND METHOD OF PRODUCING SAME

Walter W. Durant, Old Greenwich, Conn., assignor to American Cyanamid Company, New York, N. Y., a corporation of Maine No Drawing. Application January 9, 1940, Serial No. 313,105

8 Claims. (Cl. 51—298)

This invention relates to abrasives and processes of manufacturing the same.

An object of this invention is to improve abrasives particularly abrasive articles which are molded from compositions containing an abrasive grit bonded with a synthetic resin.

Another object of this invention is to improve the mixing of abrasive grit with synthetic resins, particularly those of the aminotriazine-aldehyde type.

Still another object of this invention is to produce improved abrasives bonded with melamine-formaldehyde resins. A further object of this invention is to provide improved agents for wetting abrasive grit and for swelling synthetic resin bonding material which is used with said grit.

These and other objects are attained by mixing a synthetic resin of the aminotriazine-aldehyde type with abrasive particles or abrasive grit which has been previously wet with an ester of a polyhydric alcohol, at least one hydroxyl group of which is free.

The following examples, in which the proportions are in parts by weight are given by way of illustration and not in limitation.

Example 1

| | Parts |
|---|---|
| Aluminum oxide abrasive grit, 40 mesh | 1000 |
| Ethylene glycol monoformate | 50 – 250 |
| Resin "A" (spray-dried melamine-formaldehyde resin, 1:2 ratio) | 100 – 150 |
| Phosphoric acid | 0.5– 1 |

The dry abrasive grit is charged into a suitable mixer and the ethylene glycol monoformate is added. The grit and ethylene glycol monoformate are mixed until the former is thoroughly wet or coated with the latter. The phosphoric acid may be mixed with the glycol ester or it may be mixed with the resin. The resin is then added slowly with constant agitation and the mixing is continued until a substantially dry uniform free-flowing mixture is obtained. This mixture may be molded at room temperature for about three minutes at 500–4000 pounds per square inch pressure, or optionally hot molded at 300–3000 pounds per square inch pressure at 110°–175° C. for from about five minutes to about two hours or until the resin is completely cured.

The curing of the molded article will depend somewhat on its size and shape. Generally, the molded article is removed from the mold and transferred to an oven where it may be cured at relatively low temperatures (e. g. 80° C.) until initially set, usually about one to about twenty-four hours being found to be sufficient. In order to develop optimum properties, the temperature may be raised to about or above 100° C., e. g. 110°–150° C. for from about twelve to about twenty-four hours. The resulting molded abrasive has many desirable properties such as good heat resistance, high strength, etc.

Example 2

| | Parts |
|---|---|
| Aluminum oxide grit, 40 mesh | 1000 |
| Ethylene glycol mono-acetate | 50 |
| Resin "A" | 100 – 150 |
| Phosphoric acid or phthalic acid | 0.5– 1 |

The procedure of Example 1 is followed substituting the ethylene glycol mono-acetate for the ethylene glycol monoformate used in the former example.

Example 3

| | Parts |
|---|---|
| Aluminum oxide grit, 40 mesh | 1000 |
| Ethylene glycol monoformate | 50 |
| Furfural | 15 |
| Resin "A" | 100 – 150 |
| Phosphoric acid | 0.5– 1 |

The procedure of Example 1 is repeated using a mixture of ethylene glycol monoformate and furfural in place of the ethylene glycol monoformate.

Spray-dried melamine-formaldehyde resins having melamine-formaldehyde ratios between 1:2 and about 1:4 are also particularly suitable for use in place of Resin "A."

Other sizes or kinds of grit may be used depending on the purpose for which the abrasive is intended. With finer grit slightly more resin may be required while with larger sizes somewhat less resin may be used. The proportions of resin to grit may also be varied depending on the degree of porosity of the final structure which may be desired.

Other melamine-formaldehyde resins may be substituted for the Resin "A" used in the above examples, e. g. alkylated melamine-formaldehyde resins. Furthermore mixed urea-melamine-formaldehyde resins are particularly suitable as well as the other resins mentioned below. Among the solvents for resins of the aminotriazine-aldehyde type which may be used, the partially esterified polyhydric alcohols are particularly suitable inasmuch as the range of physical properties of this class of compounds is rather broad. Accordingly a compound having the desired vapor pressure characteristics or swelling action on the resin may be selected. Any of the partly esterified polyhydric alcohols which are compatible with the particular aminotriazine-aldehyde resin to be used are suitable. Among these the following are included: ethylene glycol monocaprylate, glycerol monoformate, glycerol diformate, triethylene glycol mono-acetate, tetraethylene glycol monopropionate, pentaethylene glycol monobutyrate, hexaethylene glycol monoformate, pentaerythritol triformate, mannitol penta-acetate, alpha-propylene glycol monoformate. Other substances which exhibit wetting properties or solvent properties with aminotriazine-aldehyde resins which may be used in conjunction with the monoester of the polyhydric alcohols include: the mono and polyhydric alcohols, the monoethers of ethylene glycol and other polyhydric alcohols, the aldehydes such as furfural and benzaldehyde. Furthermore mixtures of the partially esterified polyhydric alcohols and alkyd resins, preferably either drying or non-drying, oil-modified alkyd resins may be employed, with or without the addition of other wetting materials. Obviously various mixtures of the partially esterified polyhydric alcohols may be used.

While melamine-formaldehyde resins are generally preferred as a bonding material, other aminotriazine-aldehyde resins may be used. Among these are resins produced by condensing an aldehyde, e. g. formaldehyde, acetaldehyde, propionaldehyde, butyraldehyde, hexaldehyde, heptaldehyde, crotonaldehyde, allyl aldehyde, benzaldehyde, cinnamyl aldehyde, furfural, etc., with one or more of the aminotriazines, e. g. melamine and its derivative such as 2,4,6-triethyl-, and triphenyl-triamino-1,3,5 triazines, 2,4,6-trihydrazino-1,3,5-triazine and the corresponding condensed triazines, such as melam and melem, as well as triazines containing 1 or 2 amino groups such as ammeline, ammelide, formo-guanamine, 2-amino-1,3,5-triazine and their substitution products, as well as nuclear substituted triazines such as 2-chloro-4,6-diamino-1,3,5-triazine, 2-phenyl-4-amino-6-hydroxy-1,3,5-triazine, 2 - phenyl - 4 - amino-6-hydroxy-1,3,5-triazine, 6 - methyl - 2,4 - diamino-1,3,5-triazine. Obviously commercial mixtures of the various triazines or mixtures thereof with other amino compounds may be used if desirable. One example of such commercial mixtures is the product obtained by heating dicyandiamide sufficiently to obtain a significant amount of melamine together with other reactive amino bodies. Furthermore other amino materials may be used in admixture with the triazine, e. g. urea, thiourea, dicyandiamide, etc. In some instances it is also desirable to react other substances with formaldehyde in conjunction with the aminotriazine or mixtures of aminotriazines and other substances, e. g. phenol, aniline, phenylene diamine, quinoline, etc.

Condensation products may be produced by any suitable process and with any desired combining ratio of aldehyde to aminotriazine or other reacting material from 1:1 up to 5:1, or even higher. Furthermore, the condensation products especially those of the higher ratio of aldehyde to aminotriazine, e. g. above about 3:1, may be alkylated if desired with any suitable alcohol such as ethanol, propanol, butanol, cyclohexanol, benzyl alcohol, etc.

While resins produced by condensing formaldehyde or other aldehyde with aminotriazine or condensed aminotriazine give excellent results, it may be desirable to incorporate therewith resins such as urea-formaldehyde resin, dicyandiamide - formaldehyde resin, thiourea-formaldehyde resin, mixed urea-thiourea-formaldehyde resins, phenol-formaldehyde resins, alkyd resins, etc. These resins may be prepared separately and then mixed with the aminotriazine resin or they may be made by reacting all of the reactants simultaneously as indicated above. Mixed resins suitable for use according to this invention are those containing a substantial proportion of aminotriazine, e. g. at least about 20% of the total material capable of reacting with formaldehyde in order to obtain superior characteristics which distinguish the abrasive articles of this invention from those produced with other resinous bonding materials.

The resinous bonding agent may be spray-dried, drum-dried, vacuum dehydrated, tray-dried in an oven, etc. The method of drying may somewhat affect the physical and curing properties of the resins and, therefore, a method is chosen which will produce a resin of the desired characteristics for each particular application.

Other bonding material may be incorporated with the resins such as plaster of Paris and lead oxide. Furthermore various fillers may be incorporated if desirable, e. g. clay.

While it is not necessary to use a hardening accelerator, somewhat better results are obtained if an accelerator be used. Either acid or basic catalysts may be used if desirable. The preferred catalysts include acidic substances such as phthalic acid, phthalic anhydride, tartaric acid, phosphoric acid, etc. Other catalysts which are preferred especially if the abrasive articles be hot-molded are those of the latent catalyst or delayed action type and which include the reaction products of a tertiary amine such as triethanolamine with an acid such as those mentioned above and which may be produced by reacting the acid in water with the tertiary amine, at about 65° C. to produce a substantially neutral product. Other catalysts such as the acyl imides, e. g. benzoyl phthalimide may also be used. Examples of basic catalysts are calcium oxide, sodium carbonate, sodium bicarbonate, etc.

When dry resins are used as the bonding material, the articles may be molded cold at pressures of about 500–5000 pounds per square inch and subsequently cured in ovens at a suitable temperature, e. g. at about 80°–200° C. Obviously the curing may be done at atmospheric pressure or at any elevated pressure desired. Optionally the mixture of resin and abrasive may be molded and cured in hot molds at temperatures of 100°–200° C. and at pressures up to about 5000 pounds per square inch. The time required for curing will obviously vary according to the temperature and pressure used and the size and shape of the molded piece as well as according to the particular resin which is being cured. Generally, when hot-molded, several minutes is sufficient to completely cure the resinous bonding agent. On the other hand, up to forty-eight or more hours may be taken to cure cold molded articles.

In producing abrasive articles such as sand papers and sanding cloths it may be desirable to use resinous syrups obtainable by refluxing the aminotriazine with the aldehyde in aqueous solution (with or without subsequent alkylation with an alcohol such as butanol). Furthermore in producing molded articles it may sometimes be desirable to employ resinous syrups or solutions rather than dry resins although generally the latter are preferable in the preparation of molded abrasives.

The molded abrasive may be cemented to a cloth backing after being formed or if desirable the abrasive may be molded to the cloth backing initially. For this purpose the cloth may be impregnated with an aminotriazine-aldehyde resinous syrup or any other suitable amino-aldehyde resinous syrup as well as phenol-formaldehyde resinous syrups prior to molding. In this way an abrasive is produced which may be affixed to the grinding machine on which the abrasive article is to be used.

In some instances it may be desirable to reinforce the abrasive article with paper or fabric, preferably impregnated with the same type of resin which is to be used as the bonding material for the abrasive.

Somewhat superior abrasives for special purposes may be produced by mixing filler material with an aminotriazine-aldehyde resin and suitable abrasive grit which has been wet with a partially esterified polyhydric alcohol (with or without other wetting materials). An example of such a filler is cellulose pulp. Optionally this pulp may be impregnated with an aminotriazine-aldehyde resin or with another resin, e. g. phenol-formaldehyde resin, urea-formaldehyde resin or any of the various mixed resins such as those mentioned for use as the principal bonding material for the abrasive particles.

The process described in this specification is suitable for use with any type of abrasive grit but it is especially suitable for silicon carbide grit, aluminum oxide grit, fused alumina, bort, garnet, quartz, emery and other abrasive materials.

Obviously many modifications in the process and in the articles of the type described above may be made without departing from the spirit and scope of the invention as defined in the appended claims.

I claim:

1. An abrasive grit wetted with a partially esterified polyhydric alcohol and bonded with a resin containing an aminotriazine-aldehyde condensation product.

2. An abrasive article formed from a mixture comprising an aminotriazine-aldehyde resin and abrasive grains having their surfaces previously moistened with a partially esterified polyhydric alcohol.

3. An abrasive article formed from a mixture comprising a resin obtainable by condensing a composition including an aminotriazine with formaldehyde, together with abrasive grains having their surfaces previously wet with a partially esterified polyhydric alcohol.

4. An abrasive article formed from a mixture comprising a melamine-formaldehyde resin and abrasive grains having their surfaces previously moistened with a partially esterified polyhydric alcohol.

5. An article as in claim 4 in which the partially esterified polyhydric alcohol is ethylene glycol monoformate.

6. A process which comprises thoroughly wetting an abrasive grit with a wetting solution containing a partially esterified polyhydric alcohol, mixing the wetted grit with an aminotriazine-aldehyde resin and subjecting the resin to polymerizing conditions.

7. A process which comprises wetting an abrasive grit with a partially esterified polyhydric alcohol, mixing the wet grit with a melamine-formaldehyde resin, shaping the mixture and subjecting the resin to polymerization conditions.

8. A process which comprises wetting abrasive grit with a partially esterified polyhydric alcohol, mixing the wet grit with a melamine-formaldehyde resin, molding the mixture and subjecting the molded material to resin polymerizing conditions.

WALTER W. DURANT.